United States Patent [19]
Hicke

[11] Patent Number: 5,101,643

[45] Date of Patent: Apr. 7, 1992

[54] AIR CONDITIONING METHOD AND APPARATUS FOR REFRIGERATED VEHICLES

[76] Inventor: Gerald E. Hicke, 2468 Kingfield Way, San Jose, Calif. 95124

[21] Appl. No.: 392,729

[22] Filed: Aug. 11, 1989

Related U.S. Application Data

[62] Division of Ser. No. 333,129, Apr. 4, 1989, Pat. No. 4,936,104, which is a division of Ser. No. 225,165, Jul. 21, 1988, Pat. No. 4,879,877.

[51] Int. Cl.⁵ ............................................. F25D 17/04
[52] U.S. Cl. ................................. 62/407; 108/51.1; 108/901
[58] Field of Search ..................... 62/239, 407, 413; 108/901, 56.1, 51.1

[56] References Cited

U.S. PATENT DOCUMENTS

| | | | |
|---|---|---|---|
| 2,465,134 | 3/1949 | Toffolon | 108/56.1 |
| 3,971,326 | 7/1976 | Svirklys | 108/56.1 |
| 4,467,612 | 8/1984 | Weasel, Jr. | 62/239 X |
| 4,694,962 | 9/1987 | Taub | 108/56.1 |

Primary Examiner—William E. Wayner
Attorney, Agent, or Firm—John A. Bucher

[57] ABSTRACT

A method and system for conditioning the cargo containing space of a vehicle are disclosed wherein refrigerated or heated air is introduced into a supply duct and circulated through the cargo to a return duct. The return duct or ducts are preferably formed by movable reefer pallets or racks, controlled openings in the pallets regulating flow into the return duct to develop a uniform pressure differential between the cargo space and the return duct and achieve more uniform cooling. Heat barrier spacers are arranged on vertical walls to minimize heat passage to the cargo. A method and system are also disclosed for supplying refrigerated gas through a supply duct and returning it through a return duct, a control unit being normally responsive to a master temperature sensor arranged in an inlet, a submaster temperature sensor being arranged for sensing freezing or chilling conditions and overriding the master temperature sensor.

6 Claims, 8 Drawing Sheets

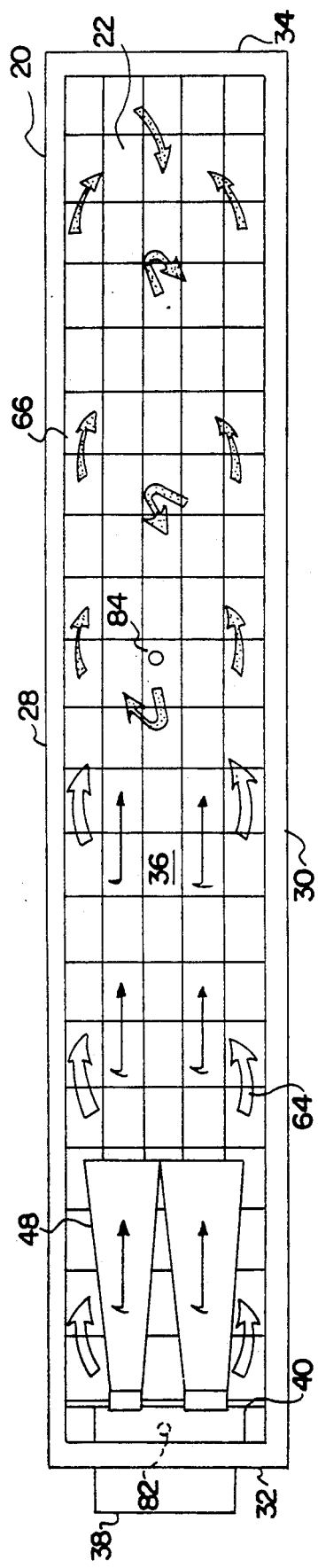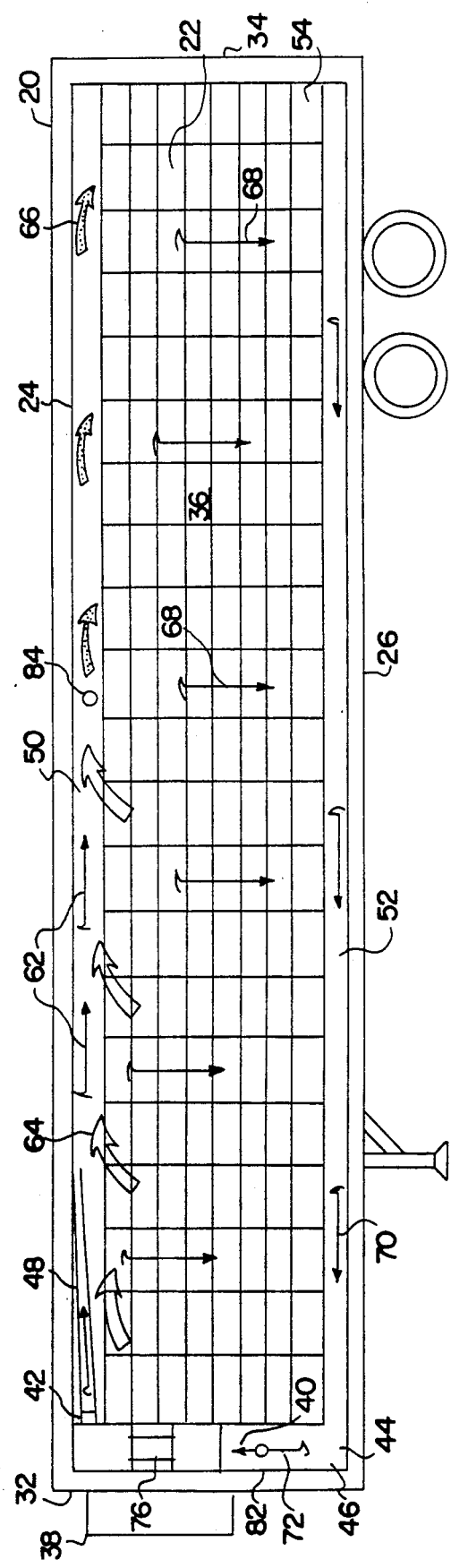

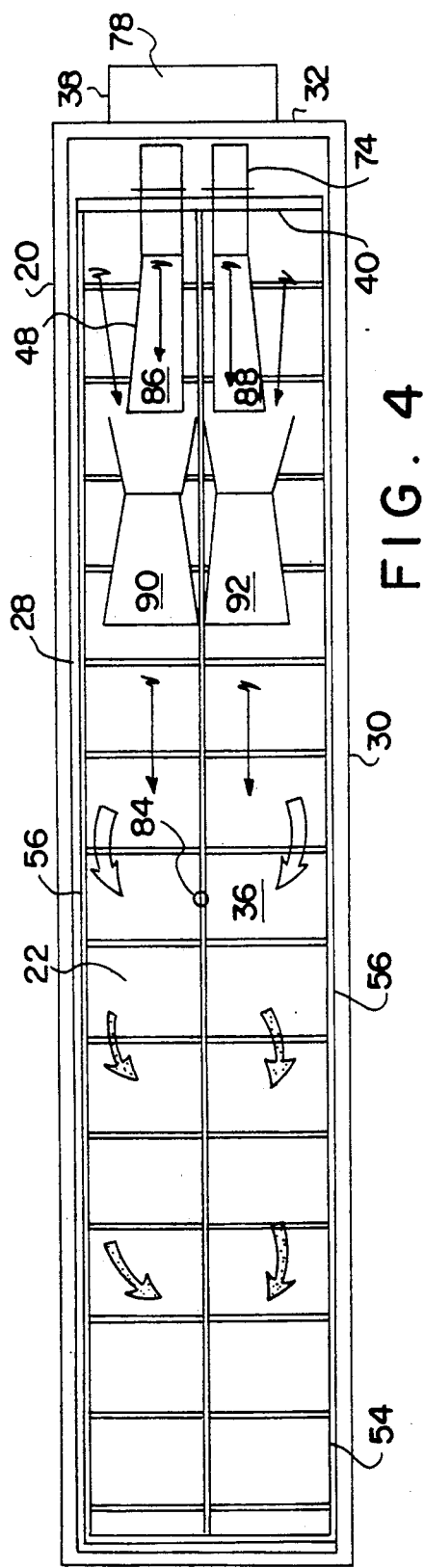
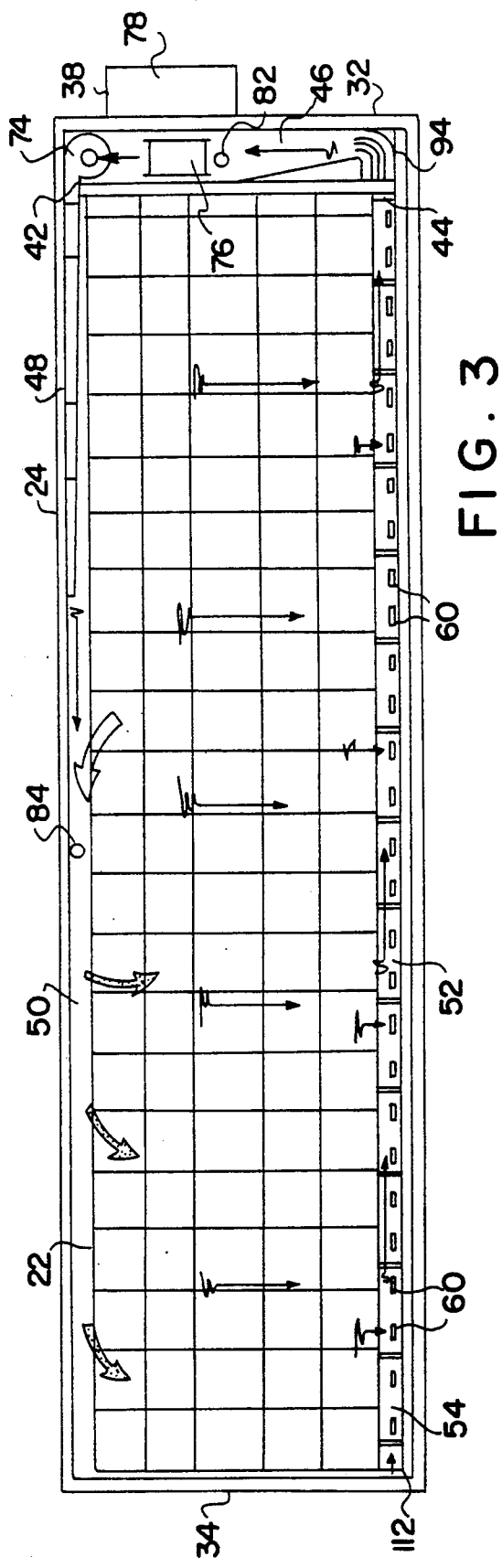
FIG. 4
FIG. 3

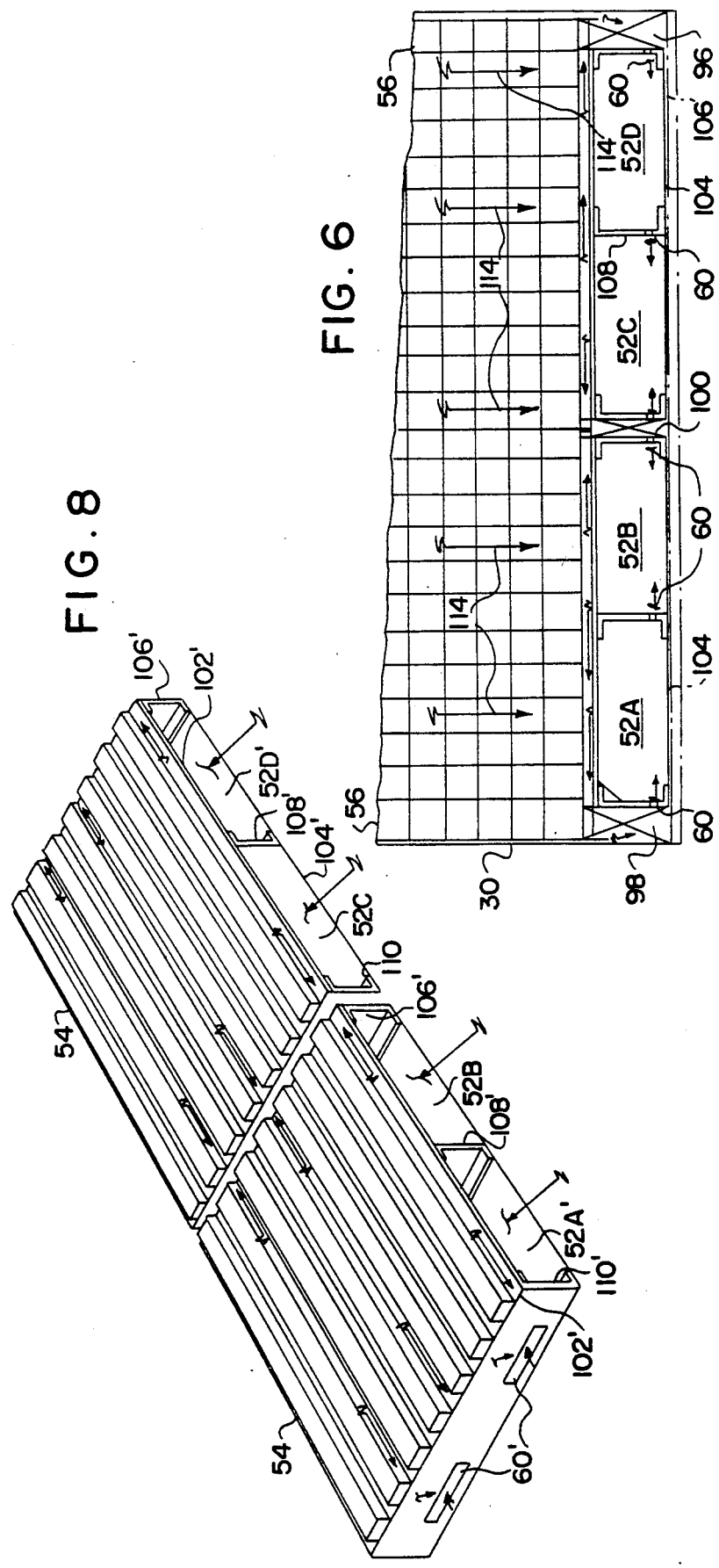

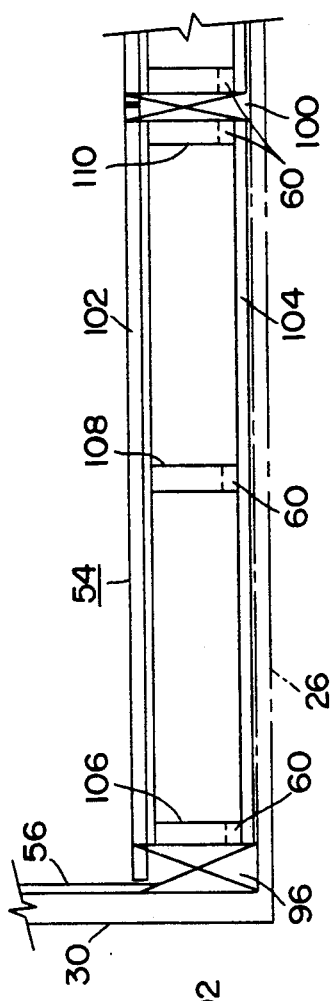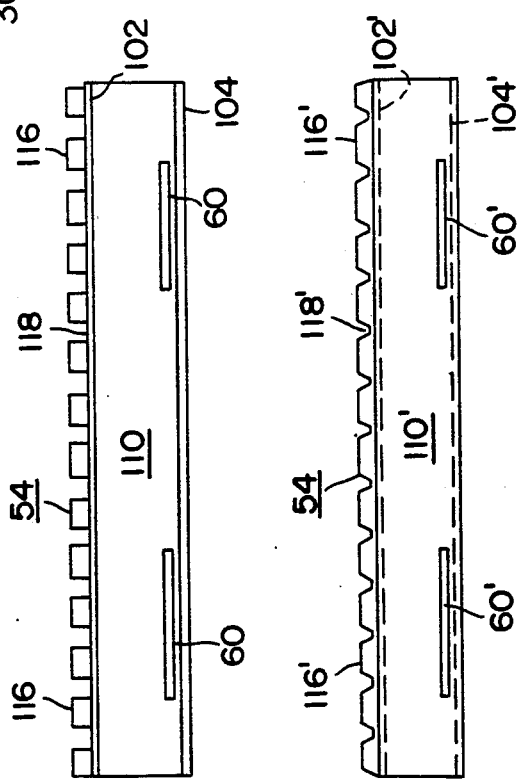

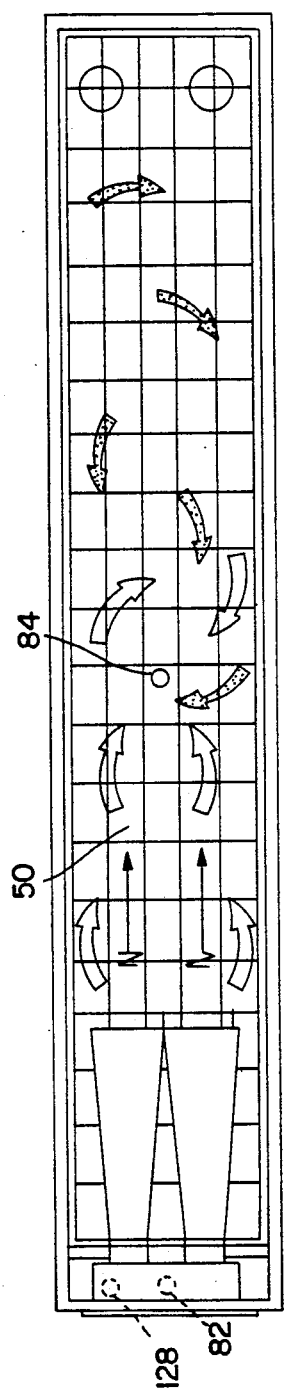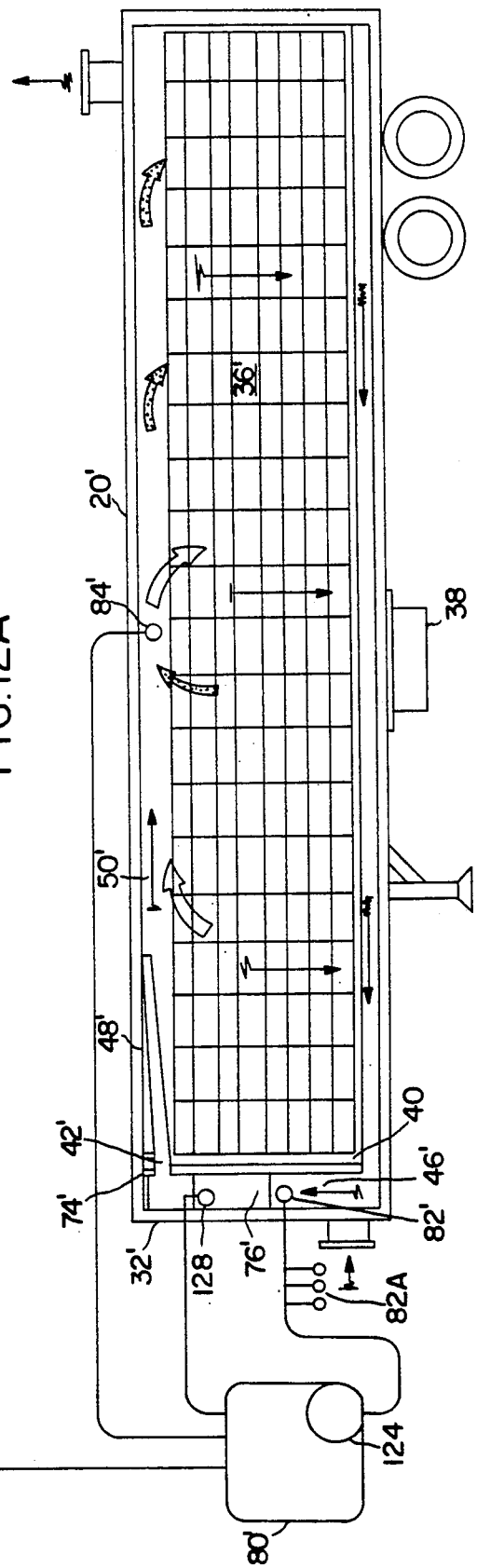

AIR CONDITIONING METHOD AND APPARATUS FOR REFRIGERATED VEHICLES

This is a divisional of copending application Ser. No. 07/333,129 filed on Apr. 4, 1989, now U.S. Pat. No. 4,936,104 which is a division of Ser. No. 07/222,165 now U.S. Pat. No. 4,879,877.

FIELD OF THE INVENTION

The present invention relates to a method and refrigeration system for air conditioning cargo containing in a vehicle normally contemplated for carrying perishable commodities and removing or supplying heat energy as required by the cargo and more particularly to such a method and system wherein a refrigerating and heating unit performs the above function with a fan or the like circulating cooled or heated air under rigid parameters of air movement and temperature control.

BACKGROUND OF THE INVENTION

Refrigerated vehicles have long been employed in a wide variety of applications including the storing and marketing of perishable commodities, particularly fruits and vegetables as well as other perishable foods including processed and frozen or chilled products such as ice cream, yeast, etc.

In any event, refrigerated vehicles have been used for transporting such commodities in different weather conditions and surrounding environment tending to affect refrigeration requirements in the vehicles.

Refrigerated vehicles contemplated by the present invention include truck trailers for road transport and piggy-back use, railroad cars and container bodies contemplated for land and sea service, for example, and the like. Accordingly, all refrigerated bodies of the type referred to above are included within the present invention under the general designation of refrigerated vehicles or vehicles with cargo containing refrigeration space.

Versatility is required in such refrigerated vehicles not only because of varying weather conditions and different environments encountered during operation but also, for example, because of the variety of applications encountered by the vehicles. For example, particularly with more perishable commodities, it may be necessary to initially operate the refrigeration system of the vehicle immediately after loading in order to first achieve desired air conditioning characteristics within the cargo containing space. Thereafter, the refrigeration system of the vehicle must be capable of uniformly maintaining closely controlled temperatures throughout the cargo containing space often under widely varying conditions.

Once the vehicle is loaded with a perishable cargo, the manner in which the cargo is loaded naturally affects the flow of refrigerated air or gas through the cargo containing space. Accordingly, the refrigeration system must accommodate different loading characteristics as well as different degrees of loads. For example, in certain applications, the cargo containing space may be entirely filled or only partially filled with the remainder of the cargo containing space being vacant.

Another particular problem encountered in such vehicles concerns heat tending to pass through the walls, including the roof and floor, the side walls and the front and rear end walls. In any event, any heat passing through the walls tends to adversely affect cargo positioned closely adjacent the wall surfaces. Although the refrigerated vehicles are provided with insulation in all surfaces, some heat will still tend to pass through the walls, floors and roof, requiring further consideration in the design and operation of the refrigeration system.

In overcoming problems of the type outlined above, prior art refrigerated vehicles have commonly been provided with a refrigeration and heating unit at one end of the cargo containing space, the cooling and heating unit being adapted for circulating refrigerated gas or air through the cargo containing space of the vehicle. Generally, the effectiveness of such refrigeration vehicles has depended upon the degree of efficiency and uniformity with which the heating and cooling unit circulates refrigerated or heated gas through perishable cargo in the cargo containing space.

A number of prior art U.S. patents have disclosed refrigeration systems for use in refrigerated truck trailers and other similar vehicles with means for circulating refrigerated gas or air through a cargo of fruit and vegetables or other perishable commodities contained in cartons, for example, or otherwise packaged. Many of these references contemplated passages along the roof and floor of the vehicle or cargo containing space for facilitating circulation of refrigerated air. Some of them also suggested side wall spacing for the same purpose.

For example, such an arrangement was generally disclosed in U.S. Pat. No. 2,923,384 issued Feb. 2, 1960 to Black; U.S. Pat. No. 3,792,595 issued Feb. 19, 1974 to Willis; U.S. Pat. No. 4,399,737 issued Aug. 23, 1983 to Severson and U.S. Pat. No. 4,467,612 issued Aug. 28, 1984 to Weasel Jr. Similar refrigeration systems were disclosed in U.S. Pat. Nos. 4,532,774; 4,553,403; 4,565,071; 3,308,738; 3,335,653; 3,570,262; 4,531,377; 4,726,196 and 4,736,597.

U.S. Pat. No. 3,792,595, noted above, also disclosed a nozzle arrangement for mixing primary air from the heating and cooling unit with secondary or ambient air within the cargo space and causing the mixture to be circulated through the cargo and cargo containing space.

U.S. Pat. No. 4,467,612, also noted above, disclosed specially fabricated, removable pallets for forming an air passage along the floor. That patent also referred to circulation of both chilled water and air for maintaining the fresh condition of produce.

Certain of the above patents also specifically referred to thermostat controls for regulating a refrigeration unit in the refrigerating system. See, for example, U.S. Pat. Nos. 4,553,403 and 4,531,377, also noted above. Typically, the thermostat or temperature sensor for such arrangements has been located in a return air duct leading to the heating and cooling unit.

In reference to the above patents, it will be noted that only certain features are covered. Emphasis on one or two phases without attention to many which constitute a complete system cannot provide the improved storage conditions essential for perishable goods.

Problems with many methods of refrigeration and heating vehicles can be readily recognized—the failure to uniformly deliver air through the cargo, air flow which bypasses the load, failure to protect the cargo against freezing and chill damage are commonly experienced.

All refrigeration systems as noted above for use in refrigerated vehicles have proven helpful to varying degrees in the transportation of various perishable commodities.

A basic premise of the air handling features discussed below for the present invention applies to a loaded vehicle. Past practices have relied on manufacturer's statements concerning air volume delivered against stated external static pressure resistance.

Moreover, conclusions based on the observation of dramatic temperature reduction (pull-down) and based on the observation of high air circulation have led to serious misconceptions of performance for the observed air handling systems.

However, there have been found to remain needs for further improvement in such refrigeration systems, particularly in the area of assuring more uniform distribution and passage of refrigerated air through a cargo regardless of the manner in which the cargo is loaded into the vehicle and also regardless of the degree to which the vehicle is filled with the cargo.

Furthermore, there has been found to remain a need for improved design in such refrigeration systems to avoid localized temperature variations occurring, for example, due to passage of heat through side walls, roofs and floors of the vehicle (even though those components are insulated). Similar undersirable localized effects of chilling and/or freezing may also occur, particularly in portions of the cargo initially contacted by refrigerated air. This may arise from localized flow conditions or patterns within the cargo containing space without necessary temperature controls.

SUMMARY OF THE INVENTION

It is therefore an object of the present invention to provide a method and system for conditioning cargo and cargo containing space in a vehicle or the like while realizing one or more preferred advantages or features.

It is a further object of the invention to provide such a method and refrigerating system for use in such vehicles or refrigerated bodies typically having a heating and cooling unit arranged at one end of an elongated cargo containing space formed by a roof, floor, side walls and front and rear end walls. A supply duct is formed adjacent the roof of the cargo containing space for distributing conditioned air or gas throughout the cargo containing space. A return duct is formed adjacent the floor for returning gas to the refrigeration unit, cargo normally being arranged in the cargo containing space to form passages for circulating the refrigerated gas through and around the cargo from the supply duct to the return duct. These passages may vary due, for example, to bulging cartons, irregular shapes and different loading patterns. Control means are arranged along the length of the cargo containing space for regulating flow into the return duct and thereby form a generally uniform pressure differential between the cargo space and the return duct in order to achieve uniform cooling throughout the cargo space.

Within the above method and refrigerating system, heat barrier/spacer means are preferably provided on selected vertical surfaces of the cargo containing space for assuring flow of the refrigerated gas therethrough from the supply duct to the return duct in order to prevent or minimize heat passage from the vertical surfaces to the adjacent load or cargo. With a heating and cooling unit being arranged at one end of the vehicle, for example, adjacent its front end wall, heat barrier/spacer means would probably not be necessary on that vertical surface but are preferably provided on the side walls and rear end wall or door.

The regulating effect of the controlled openings prevents refrigerated air in the vehicle from circulating only along the side walls and avoiding passage through interior portions of the cargo.

It is yet a further object of the invention to provide such a method and refrigerating system wherein the return duct and the controlled openings are formed by reefer pallets which are preferably movable to permit loading of the vehicle either with or without the reefer pallets in place (to permit dry freight backhaul).

The reefer pallets are preferably arranged along the length of the cargo containing space to cooperate with each other and form one or more return ducts extending toward the return opening for the refrigeration unit. The reefer pallets may, for example, be fabricated from plywood or other wood or can be formed, for example, by extrusion or fabrication from aluminum or other metals or even plastics. In any event, the reefer pallets are preferably arranged and sized to assure ample free area for air flow within the return duct so that a minimal pressure loss is experienced due to return of air toward the heating and cooling unit. At the same time, the controlled openings are formed by the reefer pallets, preferably along lateral transverse surfaces thereof, for regulating air flow from the cargo containing space into the return duct as described above.

Multiple reefer pallets as described above may be laterally arranged so that controlled openings are formed along the lateral edges of the cargo containing space as well as along the center of the cargo containing space to better facilitate passage of refrigerated air both around and through the cargo to assure even more uniform cooling of the cargo. The reefer pallets are preferably of conventional dimensions, for example, 48×40 inches.

Further in connection with reefer pallets of the type noted above with laterally formed controlled openings, the upper surfaces of the reefer pallets are preferably formed with laterally extending recesses for better assuring flow of refrigerated gas beneath the cargo toward the controlled openings. However, other arrangements of the controlled openings and recesses are of course possible in the present invention.

The design of reefer racks or pallets, as described in greater detail below, does not preclude the use of vehicle structural floors as a part of or entirely forming the racks or pallets provided that the integrity of the air handling features and the free area of the return duct is maintained as discussed below.

It is another related object of the invention to provide such a conditioning method and system as described above with a supply duct extending along the cargo containing space and a spaced apart return duct so that refrigerated air is directed through the supply duct for circulation around and through perishable cargo and into the return duct for return to the refrigeration or heating and cooling unti, control means for adjusting operation of the refrigeration unit normally being regulated by a master temperature sensor arranged generally in an inlet portion of the refrigeration unit but capable of being overriden by a sub-master temperature sensor arranged in a selected portion of the supply duct for sensing flow conditions tending to cause excessive chilling or freezing of the cargo.

More preferably, it is contemplated that refrigerated primary air is introduced into the supply duct from the refrigeration unit, for example, by nozzle means or the like tending to cause generally laminar flow in a portion of the supply duct and generally turbulent flow particularly in a portion of the supply duct remote from the heating and cooling unit. With such an arrangement, the present invention preferably contemplates arrangement of the sub-master temperature sensor in a region of generally maximum turbulent flow where the possibility of damage to the perishable cargo may be most pronounced. Even more preferably, the present invention contemplates operating of the control means for adjusting the temperature of refrigerated gas exiting from the refrigeration unit without excessively changing the flow rate of refrigerated gas through the cargo containing space.

Within a refrigeration system as disclosed above, additional means may be provided for locking out the sub-master temperature sensor, particularly when the vehicle is employed, for example, to transport perishable commodities such ice cream or the like which are specifically contemplated for being maintained in uniformly frozen condition within the cargo containing space.

Furthermore, it is also preferably contemplated that the master temperature sensor comprises a series of temperature sensors in different cross-sectional regions of the inlet for the refrigeration unit, summing or averaging means being provided for regulating operation of the control means based on a representative temperature of air in the inlet and reflecting the average temperature of the cargo.

Additional objects and advantages of the invention will be apparent from the following description having reference to the accompanying drawings.

BRIEF DESCRIPTION OF THE DRAWINGS

FIG. 1 is a side view in elevation of a refrigerated vehicle or truck trailer having a heating and cooling unit at one end and graphically representing refrigerated air flow through a cargo containing space in the vehicle according to the present invention.

FIG. 2 is a plan view of the refrigerated vehicle or truck trailer of FIG. 1.

FIG. 3 is a more detailed side view in elevation of a refrigerated vehicle constructed according to the present invention.

FIG. 4 is a plan view corresponding to FIG. 3.

FIG. 6 is an end view of two laterally arranged reefer pallets forming multiple return ducts and controlled openings for regulating passage of refrigerated air from the cargo containing space through collector ducts and into the return ducts.

FIG. 8 is a pictorial representation of two similarly arranged metal reefer pallets.

FIG. 9 is a side view of one of the reefer pallets of FIG. 6 to better illustrate the controlled openings.

FIG. 10 is similarly a side view of one of the reefer pallets from FIG. 8 to better illustrate the controlled openings.

FIGS. 9A and 10A are enlarged fragmentary end views similar to FIG. 6 illustrating the reefer pallets of FIGS. 9 and 10 respectively.

FIG. 12 is a generally schematic or block diagram of a heating and cooling unit contemplated for use in the vehicle of FIGS. 1-4 and a control system for the heating and cooling unit according to the present invention.

FIG. 12A is an plan view of the vehicle of FIG. 12.

DESCRIPTION OF THE PREFERRED EMBODIMENTS

Figure 5:
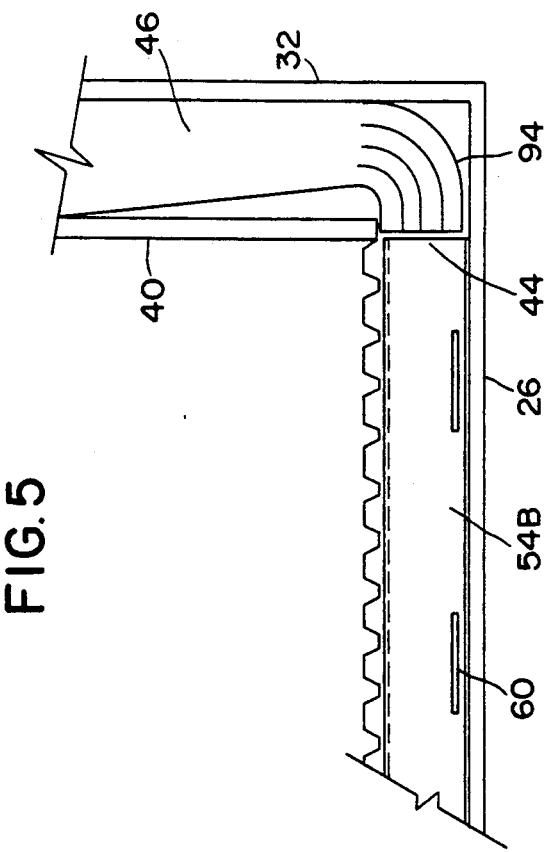
FIG. 5 is an enlarged, fragmentary view of a lower right hand corner portion of FIG. 3 to illustrate an alternate vane arrangement providing uniform volume flow between a longitudinally extending return duct and a vertically extending plenum leading to the refrigeration unit.
Figure 5A:
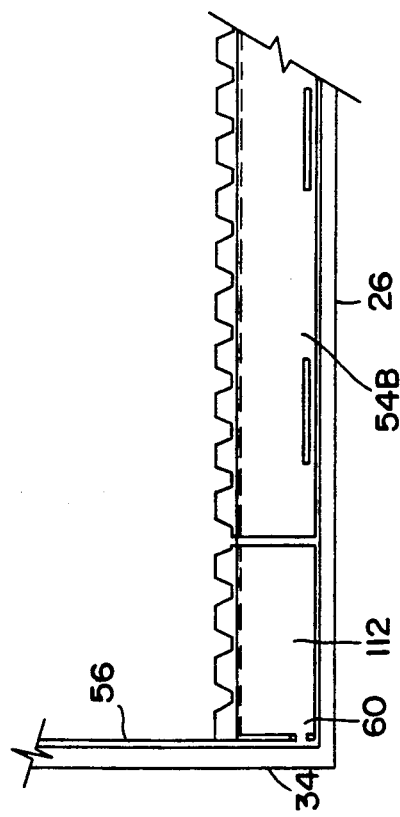
FIG. 5A is a similar to FIG. 5 and illustrates an end cap adjacent the rear door of the trailer.

Referring now to the drawings and particularly to FIGS. 1 and 2, the present invention relates to a conditioning system or apparatus embodied within a vehicle 20 having an elongated cargo containing space or region 22. As shown in FIGS. 1 and 2, the vehicle 20 is preferably a truck trailer with the cargo containing space 22 being formed by insulated and structural portions of the truck trailer including its roof 24, floor 26, side walls 28 and 30 and front and end walls respectively indicated at 32 and 34. The rear end wall 34 is conventionally provided with a door (not shown) for loading and unloading cargo into the space 22.

The vehicle 20 is preferably contemplated, according to the present invention, for carrying perishable commodities such as fruit and vegetables under refrigeration. However, the produce carried by the vehicle 20 may be even more temperature sensitive, for example, a product such as yeast or the like requiring even closer temperature regulation. Furthermore, the vehicle 20 may be employed for carrying finished goods such as ice cream or the like which must be maintained in a frozen condition. In addition to carrying perishable commodities as discussed above, versatility may require that the vehicle 20 be employed for carrying non-perishable commodities of a wide variety merely to assure that the vehicle is always carrying a load.

It is well known in the operation of such refrigeration vehicles that, after being loaded, it may be necessary to operate a refrigerating or heating and cooling system for the vehicle in order to initially condition or stabilize the cargo at an appropriate temperature. Thereafter, it is generally necessary to maintain the cargo within a predetermined temperature range and to assure that the entire cargo remains within that temperature range even under a wide variety of ambient conditions. For example, during transit, energy in the form of sunlight and the like striking the walls of the vehicle 20 may tend to pass through the walls and into the cargo containing space even with the walls of the vehicle being insulated.

Details concerning operation of refrigeration vehicles such as that indicated at 20 are only outlined above since they are well known to those skilled in the art. In any event, for purposes of the present invention, it is only necessary to understand that cargo contained within the space 22 must often be maintained within a predetermined temperature range depending upon the particular nature of the cargo.

Referring again to FIGS. 1 and 2, cargo is generally indicated at 36 within the cargo containing space 22 and is preferably in the form of cartons, crates or packages (which may contain produce or the like).

According to the present invention, a refrigeration or heating and cooling unit 38 is provided at one end of the vehicle 20, preferably adjacent the front end wall 32. The refrigeration unit 38 is isolated from the cargo containing space 22 by walls of a bulkhead 40 forming an outlet 42 formed adjacent the roof 24 for communicating refrigerated air from the refrigeration unit 38 into the cargo containing space 22. An inlet 44 is also formed by the sealed bulkhead 40 for allowing return gas from the cargo containing space 22 to enter a plenum 46 formed beneath the refrigeration unit 38 without undesirable bypass.

The outlet 42 is preferably in communication with the cargo containing space 22 by means of a nozzle 48 designed to facilitate more uniform distribution of refrigerated gas from the outlet 42 throughout the cargo containing space 22.

In order to accomplish more uniform distribution of refrigerated air around and through the cargo 36 contained in the space 22, a supply duct 50 is formed adjacent the roof 24 and cargo loaded into the cargo containing space 22, the supply duct 50 extending substantially along the entire length of the vehicle from the outlet 42 to the rear end wall 34 of the vehicle. Similarly, a return duct 52 is formed adjacent the floor 26 of the vehicle. Preferably, the supply duct 50 is formed by arrangement of the cargo 36 in order to leave adequate overhead space forming the supply duct 50. However, if desired, a grid or the like (not shown) could be provided in spaced apart relation from the roof 24 to assure that the cargo 36 does not interfere with the necessary flow characteristics for the supply duct.

The return duct 52 is preferably formed by removable reefer pallet means 54 which can be positioned as shown in FIGS. 1 and 3 to form the return duct 52 or which can be removed to allow loading of non-perishable cargo directly upon the structural floor 26 of the vehicle. A preferred construction for the reefer pallets 54 is described in greater detail below. In any event, it is obvious that both the floor 26 and movable reefer pallet means 54 must be of sufficient structural strength to support the weight of the cargo 36.

Figure 11:
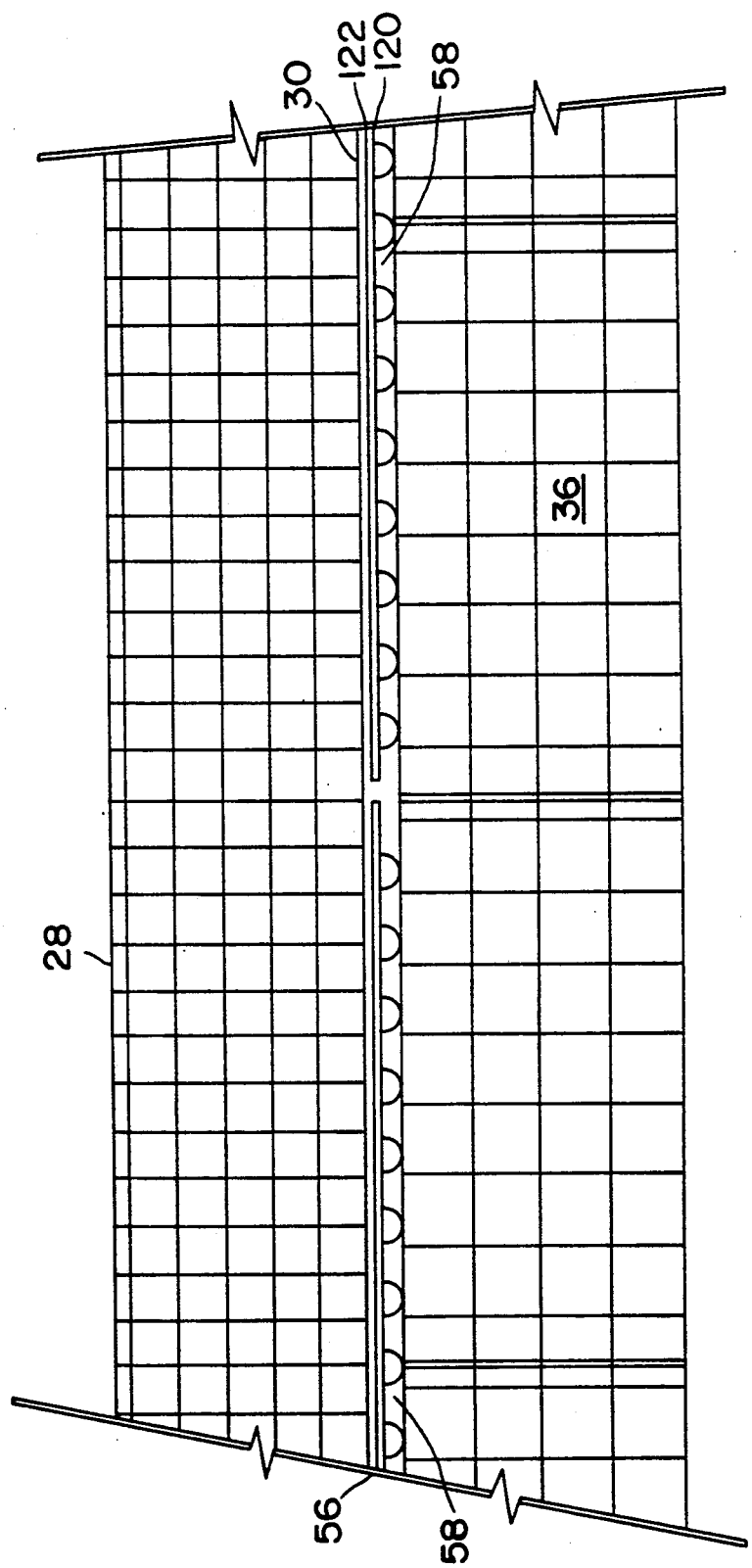
FIG. 11 is an enlarged view taken from FIG. 4 as indicated at XI from FIG. 4 to better illustrate heat barrier/spacer means arranged along vertical side walls of the cargo containing space.

Referring also to FIG. 11, the invention preferably contemplates the arrangement of heat barrier/spacer means 56 along vertical surfaces of the cargo containing space 22 such as the side walls 28 and 30 in order to assure a relatively free space between the cargo 36 and the vertical surfaces for air flow. Preferably, the heat barrier/spacer means 56 comprises corrugated paneling as illustrated in FIG. 11 forming openings 58 extending vertically between the supply duct 50 and the return duct 52. The corrugated paneling is further of a type having sufficient structural strength to resist crushing, for example, upon shifting of the load 36, in order to assure the desired spacing adjacent the vertical surfaces during operation of the vehicle.

Referring particularly to FIG. 3, control means 60 are preferably provided as controlled openings formed in lateral surfaces of the reefer pallet means 54 for regulating flow of refrigerated air from the cargo containing space into the return duct 52. The control means 60 are preferably designed for forming a generally uniform pressure differential between the cargo space 22 and the return duct 52 in order to achieve more uniform cooling throughout the cargo space 22.

The combination of features briefly summarized above assures that refrigerated air from the refrigeration or heating and cooling unit 38 is uniformly circulated mainly through and around the cargo 36 along the entire length of the cargo containing space 22 in order to achieve more uniform temperature level throughout the cargo. Initially, it is necessary to allow for different loading characteristics of the cargo 36 into the cargo containing space 22 in order to assure that the refrigerated air from the supply duct 50 passes through and around the entire mass of the cargo 36. This is achieved by the pressure differential established by the controlled openings 60 while being further facilitated by additional features such as the preferred construction of the reefer pallet means 54 as described in greater detail below, pressure characteristics of a fan supplying air flow, etc.

The heat barrier/spacer means 56 further assure that heat tending to pass through the side walls 28 and 30 is minimized or prevented from affecting the cargo 36 (especially that closely adjacent the side walls 28 and 30). Thus, the spacer means 56 serves both to assure initial loading of the cargo in spaced apart relation from the side walls while also preventing the cargo from shifting during transport into contact with the side walls.

In operation, the refrigeration unit 38 is operated by control means described in greater detail below for causing refrigerated air to flow into the supply duct 50. Referring particularly to FIGS. 1 and 2, refrigerated air entering the supply duct 50 from the outlet 42 and preferably through the nozzle or induction unit 48 initially experiences laminar flow as generally indicated by the straight arrows 62 extending approximately half way through the length of the cargo containing space 22. Some induced flow of ambient refrigerated air from the cargo space 22 is caused by the nozzle or induction unit 48 as represented by the hollow arrows 64.

As laminar flow of air through the supply duct 50 approaches the opposite end of the vehicle (the rear end wall 34) and also interacts with the cargo 36 and other surfaces throughout the cargo containing space 22, it tends to be converted into turbulent flow represented by the curved arrows 66.

With refrigerated air being uniformly distributed throughout the supply duct 50, it tends to flow downwardly through passages formed within the cargo 36 (not shown) and through the heat barrier/spacer means 56 as represented by the vertical arrows 68. Here again, distribution of air both in laminar flow and turbulent flow (62 and 66) within the supply duct and around and through the cargo, as indicated at 68, is more uniform because of the pressure differential caused by the control means 60.

The air finally flows into the return duct 52 through the controlled openings 60 (and collector ducts as described below with reference to FIG. 6) as represented by the arrows 70. The air then passes freely forward through the return duct 52 to the plenum 46 and then upwardly as represented by the upwardly extending arrows 72 to repeat the cycle described above.

In order to properly maintain the desired pressure differential between the supply duct and the return duct, it is preferably contemplated that any unloaded portions of the vehicle floor or pallets be substantially covered to simulate the presence of cargo. For example, the uncovered portion of the floor or pallets could be merely covered by kraft paper or the like to simulate the effect of cargo in that area. This arrangement is preferable so that the controlled openings may be designed based on the assumption of uniform cargo loading throughout the vehicle.

Another important feature of the invention concerns the method and apparatus by which operation of the refrigeration unit is controlled. Initially, the refrigeration or heating and cooling unit is designed for generally constant air flow through the cargo containing space 22 as established by a fan 74 connecting the refrigeration unit with the outlet 42 and the nozzle or induction unit 48 (see FIG. 3). More particularly, the refrigeration unit includes a conventional coil unit 76 to which refrigerant is supplied from a compressor unit 78. These components are of conventional construction and are accordingly not described in any greater detail herein. In any event, the coil unit 76 is of a type containing fins or the like (not shown) with return air from the plenum 46 flowing upwardly through the coil unit 76 to be properly heated or cooled for recycling to the cargo containing space 22 through the nozzle or induction unit 48.

The compressor unit is generally illustrated in FIG. 1 adjacent an end of the vehicle. However, it is to be understood that its actual location on the vehicle may vary, for example, in order to facilitate operation of the vehicle and/or to simplify its construction.

As noted above, the present invention generally contemplates constant volume air flow through the cargo containing space 22 by constant speed operation of the pump or fan 74 with regulation of the heating and cooling unit being accomplished by operation of the compressor 78 in order to adjust the temperature of refrigerant supplied to the coil unit 76.

In this regard, the present invention contemplates a control unit 80 for regulating operation of the refrigeration or heating and cooling unit 38, more particularly the compressor 78 as noted above. The control unit 80 in turn normally functions in response to a master temperature sensor 82 arranged adjacent the inlet 44 or more specifically within the plenum 46 in order to monitor the temperature of air entering the coil unit 76. With this combination, operation of the unit 38 normally functions in response to the temperature of air within the plenum 46 to assure that it is properly cooled (or heated) to maintain a desired temperature range for the cargo 36 within the space 22.

However, the present invention is further based upon the realization that isolated chilling or freezing of portions of the cargo 36 may occur, principally in a region of maximum turbulence for the supply duct 50. In order to prevent such localized and undesirable chilling or freezing of a portion of the cargo 36, a sub-master temperature sensor 84 is illustrated in place within a region of maximum turbulence in the supply duct 50. Both the master temperature sensor 82 and the sub-master temperature sensor 84 may be set to operate within predetermined temperature ranges principally depending upon the nature of the cargo 36.

The specific location of the sub-master temperature sensor 84 may vary for different vehicles or bodies, usually because the location of maximum turbulence can be affected by design changes of vehicle. For example, with truck trailers of increasing or decreasing length, the location of maximum turbulence may shift along the length of the vehicle.

In any event, the sub-master temperature sensor 84 is coupled with the control unit 80 to override the master temperature sensor 82 when conditions of localized chilling or freezing are sensed within the supply duct 50. Upon overriding actuation of the sub-master temperature sensor 84, the compressor unit 78 is essentially cut back in operation to avoid the conditions of localized chilling or freezing as noted above.

Operation as to this feature of the invention concerns refrigerated air being supplied to the cargo containing space through the supply duct 50 and returned by the return duct 52 spaced apart from the supply duct 50 to assure flow of the refrigerated air through the cargo. The refrigeration unit 38 is normally operated under regulation of the master temperature sensor 82. However, localized conditions tending to cause chilling or freezing within the cargo 36 are sensed by the sub-master temperature sensor 84 which functions as described above to override the control unit 80 and cut back operation of the refrigeration or heating and cooling unit 38 as necessary to avoid chilling or freezing of a portion of the cargo.

An important feature of the sub-master temperature sensor concerns substantial savings or refrigerating capacity and power. This feature of the invention results from the sub-master sensor or control stopping compressor operation while maintaining return air flow above freezing temperatures to melt frost accumulated on the cooling coil surfaces.

The method and apparatus summarized for each of the features discussed above is set forth with reference to basic features of the invention for emphasis. However, additional features are provided to further enhance the different features in both the method and refrigerating system of the present invention. Those additional elements of the invention are discussed in greater detail below.

Before describing the additional features of the invention, it is first noted that certain operating parameters for the refrigeration system of the invention must be considered relative to a number of criteria including the size of the vehicle 20, more particularly the cargo containing space 22, the type of perishable commodities to be transported by the vehicle and ambient conditions which the vehicle may be expected to encounter during operation. Additional parameters may include, for example, the degree of insulation provided within the walls of the vehicle and operating characteristics for the refrigeration or heating and cooling unit 38 which, in themselves, are beyond the scope of the present invention. However, such parameters, particularly operating characteristics of the unit 38, must be considered in connection with the invention.

Generally, a truck trailer of the type indicated at 20 in FIGS. 1 and 2 may have an internal width of about eight feet, for example, and height of about nine feet, for example. The internal length of the cargo containing space 22 may range from as little as 20 to 30 feet to lengths of 60 feet and even more, for example. Other types of refrigerated vehicles also contemplated by the present invention may have substantially different dimensions. For example, refrigerated railroad cars and refrigerated container bodies may also include the refrigeration method and apparatus of the present invention while requiring some modification in operating parameters to accommodate size variations.

It is again noted that the present invention preferably contemplates operation of its refrigeration system with generally constant volume flow of refrigerated air through the cargo containing space 22 when maximum cooling or heating is required. Accordingly, the pump or fan 74 is sized to provide refrigerated air flow in the approximate range of about 1,200 to 3,000 cu. ft. per minute, for example.

Once again, it is noted that specific operating characteristics for the refrigeration system are dependent not only upon the cargo being carried but also the size and construction of the refrigerated vehicle and a range of other factors. A detailed discussion of such factors is not presented herein in order to concentrate on a clear and concise presentation of the invention.

In any event, it is generally contemplated that, for a range of commodities, the refrigeration system of the present invention is to be operable for maintaining a uniform temperature throughout the cargo containing space 22 and throughout the cargo 36 in the range of about 32° to 60° F. with ±½ degree variation. This corresponds generally to a range of about 2° to 16° C. with approximately ±0.3 degree variation and is contemplated for use with fresh perishables maintained above freezing conditions.

It is also preferable according to the present invention that the refrigeration system be capable of maintaining uniformity of temperature within a range of about plus or minus one degree Fahrenheit or about plus or minus 0.6 degrees Centigrade. A more preferred temperature range within the cargo containing space 22 is approximately 33° F. to about 60° F. or, in other words, from about 2° C. to about 15° C.

At the same time, temperature adjustment within the cargo containing space 22 may be desirable or necessary over approximately the same temperature range in order to prevent localized chilling or freezing of the cargo. Note that the sub-master temperature sensor 84 is contemplated for maintaining protection against localized chilling or freezing. With the vehicle 20 also being contemplated for use with frozen commodities, it may be desirable to maintain a uniform temperature within the cargo containing space 22, for example, in the range of about −20° F. to about +20° F. or about −30° C. to about −7° C. Once again, it is noted that these temperature ranges and the like are provided only by way of illustration and, while they may be of assistance in defining preferred characteristics of the invention, they are not to be taken as limiting the invention.

Additional features of the invention are described below with reference to the drawings. Initially, referring to FIGS. 3 and 4, the nozzle unit 48 comprises a pair of nozzle elements 86 and 88 each constructed with a slightly expanding cross-section and directed along the length of the supply duct 50. Induction elements 90 and 92, as best illustrated in FIG. 4, are constructed with double tapers and arranged in slightly overlapping relation with the respective nozzle elements 86 and 88 in order to induce or circulate a greater amount of ambient air from the cargo containing space 22 along with the primary air from the nozzle elements 86 and 88. Ambient air flow induced by the elements 90 and 92 was discussed above as induction flow indicated at 64 in FIGS. 1 and 2.

In any event, the combination of the nozzle elements 86, 88 and induction elements 90, 92 as illustrated in FIGS. 3 and 4 is particularly contemplated for use in vehicles having relatively long cargo containing spaces 22, for example, greater than about 45 feet in length.

The discharge air nozzles, as illustrated in FIG. 4, are designed to accommodate the addition of induction unit accessories such as the elements 90 and 92 depending upon vehicle size, design and type of products being handled or transported. In particular, the specific nozzle configuration may be selected to enhance performance by increased secondary air flow throughout the cargo space.

As a further example, the nozzle configuration of FIG. 4 can be employed without the induction elements 90 and 92. Such an arrangement would particularly be contemplated for vehicles of relatively short length. At the same time, the length and degree of taper for the nozzle elements 86 and 88 can also be varied to achieve greater control over air flow throughout the cargo space.

Thus, substantial modification of components within the nozzle and induction unit 48 may be employed within the scope of the present invention in order to adapt the refrigeration system for any of a variety of operating conditions.

The employment of high air velocity nozzles to provide laminar air flow provides a means for measuring mass air flow of the system and moreover provides an accurate means for determining air volume at reduced speeds and cooling performance. The determination of air volume under such conditions as mentioned under existing codes of testing are considered highly inaccurate by comparison to the present invention.

Referring particularly to FIG. 3, it is again noted that the return duct 52 extends horizontally along the floor 26 and is connected with the plenum 46 through the inlet 44. The plenum 46 is vertically arranged beneath the refrigeration or heating and cooling unit 38 or more particularly the coil unit 76.

More uniform flow transition between the horizontal return duct 52 and the vertical plenum 46 is accomplished by a plurality of turning vanes 94 uniformly spaced apart from each other and extending laterally substantially the entire dimension of the inlet 44 and the plenum 46. The turning vanes 94 have a gradual curvature varying from initially horizontal to generally vertical in order to facilitate flow transition through the inlet 44 and upwardly into the plenum 46 to further facilitate efficient operation of the refrigeration unit 38.

A modified design for the turning vanes 94 is illustrated in FIG. 5. Referring to that figure, the vanes 94′ maintain a generally uniform cross-sectional area of flow for air flowing from the return duct 52 through the inlet 44 and upwardly into the plenum 46 to further enhance efficient operation of the refrigeration unit 38.

Preferred construction for the reefer pallets 54 is illustrated in FIGS. 6–10 as discussed in greater detail below.

Figure 7:
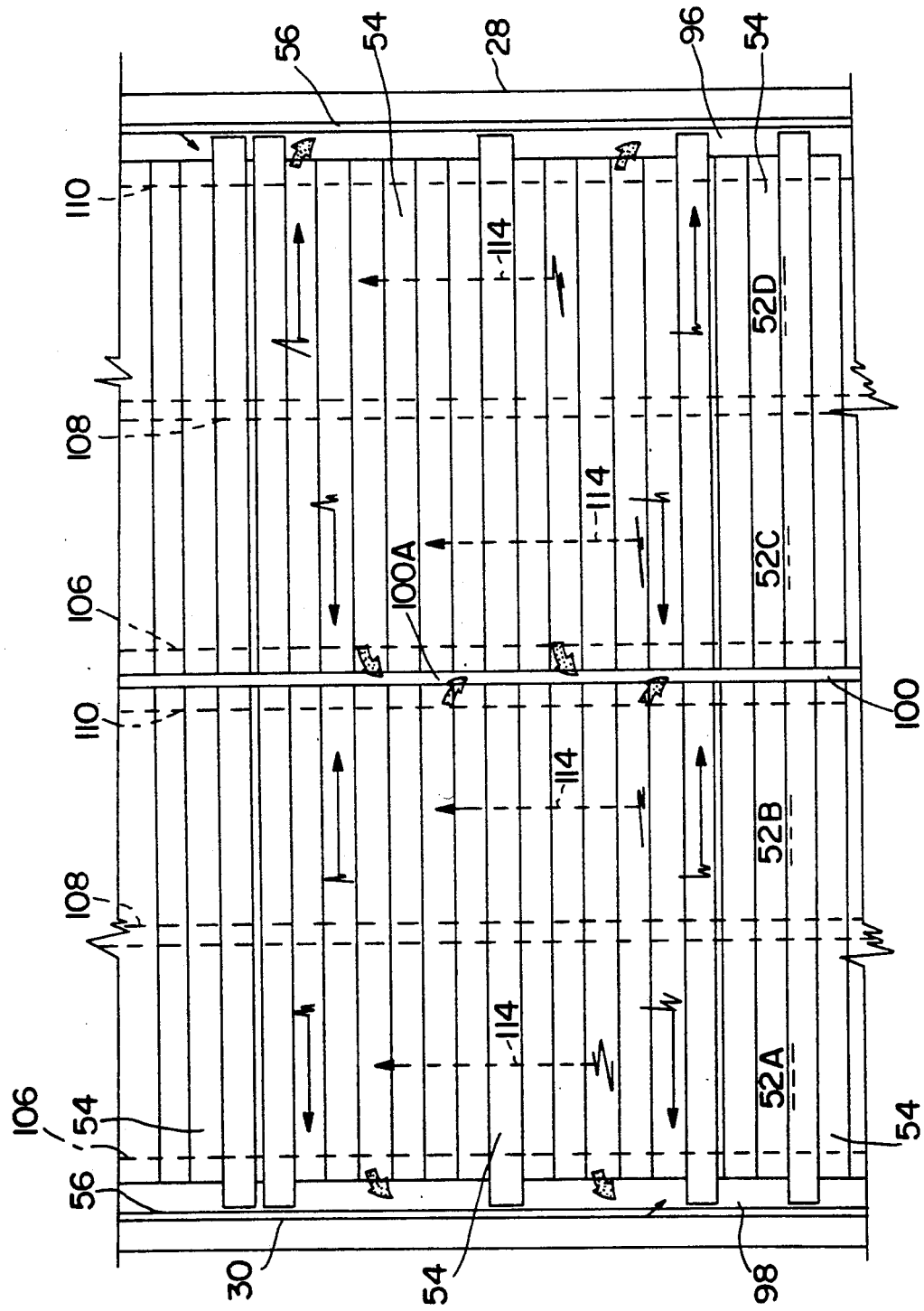
FIG. 7 is a plan view of the laterally arranged reefer pallets of FIG. 6. The reefer pallets of FIG. 6 are formed from metal while the pallet of FIG. 7 is formed from plywood.

Initially, FIGS. 6, 7 and 9 illustrate a side-by-side or lateral arrangement of reefer pallets 54 which are fabricated from plywood and form parallel returns ducts 52A, 52B, 52C and 52D. The reefer pallets 54 are maintained in centered relation by their construction to form collector ducts 96 and 98. Spacing between the adjacent reefer pallets 54 is maintained to form a central collector duct 100.

Generally, the reefer pallets 54 comprise upper and lower plates or sheets 102 and 104 interconnected by means of risers 106, 108 and 110. The risers 106 and 110 are arranged adjacent lateral edges of the respective reefer pallets 54 while the other riser 108 is centrally arranged therebetween. All of the risers 106–110 are parallel with the side walls 28 and 30 so that the return ducts 52A–52D extend substantially along the entire length of the cargo containing space 22 (see FIGS. 3 and 4) from the rear end wall 34 to the bulkhead 40.

In addition, the reefer pallets 54 are formed so that they interact with each other to form the return ducts as enclosed regions except for the controlled openings 60, described in greater detail below. At the forward end of the cargo containing space 22, all of the return ducts 52A-52D are in communication with the inlet 44. Referring also to FIG. 3, an end cap 112 is preferably arranged on a reefer pallet 54 positioned against the rear end wall 34 to further assure that refrigerated air is allowed to enter the return ducts 52 only through the controlled openings 60.

The controlled openings 60 are preferably formed as elongated slots not only in the lateral risers 106 and 110 but also in the central riser 108 in order to permit equalizing of pressure and flow between adajacent return ducts 52 formed by each row of reefer pallets 54. The spacing and sizing of the controlled opening 60 is of course subject to substantial variation depending upon a wide range of characteristics as discussed in greater detail above. In any event, it is preferably contemplated that the controlled openings 60 be of a size and spacing so that pressure within the return ducts 52A-52D remains below the pressure of refrigerated air in the supply duct 50 and the cargo containing space 22.

At the same time, it is also important to assure a substantial combined cross-sectional area for the return ducts 52A-52D in order to assure relatively free flow of refrigerated air toward the inlet 44 (see FIG. 3).

Generally, with the reefer pallets 54 having a nominal height of about 6 to 8 inches, it is desirable to maintain an open profile for the return ducts comprising at least about 60 to 80% of the entire cross-sectional area of the reefer pallets.

With free circulation thus assured through the return ducts and with the controlled opening 60 sized as described above, air from the supply duct 50 (see FIG. 3) flows downwardly through the spacers 56 and through passages formed by the cargo 36 as represented by the arrows 114. Cleats or bars 116 are also arranged or formed in spaced apart relation upon the upper sheet or panel 102 of the reefer pallets 54 in order to form laterally extending recesses 118. The recesses 118 assure that refrigerated air passing downwardly through the cargo, as indicated at 114, is conducted either laterally outwardly toward the side walls 28 and 30 or inwardly toward the space between the laterally adjacent reefer pallets 54 as represented in FIG. 6. In any event, the laterally extending recesses 118 and the heat barrier/spacer means 56 assure that refrigerated air passing around and through the cargo from the supply duct 50 is freely accessible to the controlled openings 60 so that they can properly function to maintain the desired pressure differential between the return ducts 52 and the cargo containing space 22.

It is to be understood that other arrangements of the controlled openings, recesses and collector ducts are possible in addition to those specifically and preferably described above, to achieve the objectives of the invention.

Another variation of a reefer pallet is indicated at 54 in FIGS. 8 and 10. Referring particularly to FIG. 8, two of the reefer pallets 54 are illustrated in lateral or side-by-side relation similar to the arrangement illustrated in FIGS. 6 and 7. The reefer pallets 54 in FIGS. 8 and 10 are of generally similar construction as the reefer pallets 54 in FIGS. 6, 7 and 9 except for the material from which they are formed or fabricated. Accordingly, various components of the reefer pallets 54 are indicated by primed numerical figures corresponding to those employed for identifying components in the reefer pallets 54 of FIGS. 6, 7 and 9.

All of the components in the reefer pallets 54 are preferably formed from a lightweight, non-corrosive metal such as aluminum. The upper sheet 120' and the cleats 116' are preferably formed as a single extruded sheet (see both FIG. 8 and FIG. 10) with similar laterally extending recesses 118'. Sizing and arrangement of the return ducts 52A', 52B', 52C' and 52D' are also similar to that described above for the reefer pallets 54 of FIGS. 6, 7 and 9. Similarly, the controlled openings 60' are also formed with similar sizing and spacing as discussed above in connection with the reefer pallets 54.

Thus, the reefer pallets 54 are representative of movable reefer pallets or racks suitable for use within a refrigeration system of the type contemplated by the present invention and illustrated, for example, in FIGS. 1-4.

The heat barrier/spacer means 56 referred to adjacent the side walls 28 and 30 in FIG. 4 and FIG. 6 is illustrated in FIG. 11 as a corrugated panel 120 secured to a single facing panel 122. The heat barrier/spacer means 56 is arranged upon the side walls with the facing panel 122 adjacent the cargo 36. The corrugated panel 120 preferably has sufficient strength to prevent crushing of the spacer means 56 between the cargo 36 and any of the vertical surfaces are formed, for example, by the side walls 28 and 30. The heat barrier/spacer means 56 preferably has a minimum thickness in the range of about ⅛ to 3/16 of an inch so that the openings 58 will allow a relatively substantial flow of refrigerated air along the vertical surfaces of the cargo containing space 22 for the purpose discussed above.

The heat barrier/spacer means 56 are preferably removably arranged or hung on the walls to facilitate their installation as a load is being placed in the vehicle. Furthermore, similar heat barrier/spacer means could be inserted between portions of the load, especially for very dense cargo, to facilitate circulation of air therethrough, if desired.

The incorporation of the heat barrier/spacer panels as interior side wall liners for the vehicle is subject to optional use by the manufacturer. Such optional use is acceptable provided the air spaces and air films for achieving insulating values adjacent the vertical walls are retained as well as structural characteristics to isolate the cargo, such as products in cartons, and to shield the cargo from vertical surface heat gains or heat transmission.

Operation of the refrigeration unit 38' in combination with the control unit 80' and the master temperature sensor and sub-master temperature sensor discussed above is further illustrated in the schematic diagram of FIG. 12. Referring to that figure, the above components are arranged as previously discussed within the refrigeration system of the invention, specifically within the refrigeration vehicle 20 as discussed above in connection with FIGS. 1-4. However, FIG. 12 illustrates a variation from FIG. 3 in that the single master temperature sensor 82 of FIG. 3 is replaced by an array of master temperature sensors 82A arranged in different cross-sectional portions of the plenum 46'. In order to assure more accurate determination of average air temperature within the plenum 46' approaching the coil unit 76', the various master sensors 82A are coupled with a summing junction 124 which is interconnected with the control unit 80. The summing junction 124 is a generally conventional electronic component with combined input from the multiple master temperature sensor 82A and provides a single signal to the control unit 80' corresponding to a representative temperature across the entire plenum 46'. Preferably, the summing junction 124 is adapted to provide a signal to the control unit 80' corresponding to an approximate average or mean value for the temperatures sensed in different portions of the plenum 46' by the master temperature sensors 82A.

Widely varying air temperatures can result from loads including both warm and precooled products.

The control unit or temperature control system also provides other functions in addition to the master and submaster thermostats.

A sensor 126 is installed in the compressor crankcase 130 to terminate heat supply to the crankcase and evaporate liquid refrigerant which migrates to the crankcase during cold weather conditions. Thus, impaired lubrication of compressor bearings due to oil dilution and the liquid refrigerant flowing (liquid slugging) above the pistons and through the valves causing rattling or hammering noises is prevented.

Another sensor 128, besides the master temperature sensor, is preferably installed in the evaporator coil mass to accurately measure coil mass temperature and stop the application of heat required to melt frost or ice during the defrost cycle.

The ability to maintain closely controlled uniform cargo temperature provides services not available with current refrigerated vehicles. Three valuable services are made possible by the present invention, including:

(1) maintaining cargo temperatures slightly above the freezing temperature of certain products permits the eradication of pests such as fruit fly larva through "cold treatment". Such operations may require monitoring actual cargo temperature with electronic sensors as an accessory to prevent product freezing;

(2) maintaining uniform air flow in a refrigerated vehicle permits the introduction of inert gases such as dry nitrogen to enhance cold storage conditions particularly in long haul services. The introduction of gases in the return air plenum and diffusion throughout the entire cargo by repeated dilution procedures can lower the oxygen levels to a negligible level; and (3) optionally employing noxious gases to kill pests in properly equipped refrigerated vehicles. The removal and dispersion of such gases becomes possible by opening hatches to introduce outside air into the cargo space and roof hatches to which high air velocity fans are installed will purge and disperse the poisonous gases to suitable areas vertically upward without danger to personnel. External vents are shown in the embodiment of FIG. 12 to facilitate introduction of such gases into the cargo containing space and for purging the gas from the vehicle when and where suitable.

There have been described above multiple embodiments of a refrigerating system constructed in accordance with the present invention and operable in accordance with one or more methods of the invention. Numerous variations and modifications will be apparent to those skilled in the art from the preceding description in addition to those specifically set forth above. Accordingly, the scope of the present invention is defined only by the following appended claims.

What is claimed is:

1. A reefer pallet suitable for use in a refrigeration system for a vehicle with an elongated cargo containing space formed by a roof, floor, side walls and front and rear end walls, the refrigeration system being associated with a refrigeration or heating and cooling unit mounted at one end of the cargo containing space, the refrigeration unit having an outlet in communication with the cargo containing space adjacent its roof and an inlet in communication with the cargo containing space adjacent its floor, the reefer pallet comprising fabricated pallet components comprising upper and lower plates, side walls and means for providing structural support in the pallet, the components forming at least one return duct extending along an entire dimension of the pallet, and control means formed by the pallet for regulating air or gas flow into the return duct, the pallet further being adapted for abutting arrangement of multiple pallets along the length of the vehicle to form an enclosed return duct along the vehicle and in communication with the inlet whereby only the control means and return duct of the abutting pallets are capable of regulating refrigerated gas or air flow into the return duct to thereby form a substantially uniform pressure differential between the cargo containing space and the return duct in order to achieve more uniform cooling throughout the cargo containing space.

2. The reefer pallet of claim 1 wherein the control means comprises openings formed in the pallet components for regulating gas or air flow from the cargo containing space into the return duct formed by the reefer pallet.

3. The reefer pallet of claim 2 wherein the controlled openings are formed in spaced apart relation along lateral surfaces of the reefer pallet.

4. A reefer pallet suitable for use in a refrigeration system for a vehicle with an elongated cargo containing space formed by a roof, floor, side walls and front and rear end walls, the refrigeration system being associated with a refrigeration or heating and cooling unit mounted at one end of the cargo containing space, the refrigeration unit having an outlet in communication with the cargo containing space adjacent its roof and an inlet in communication with the cargo containing space adjacent its floor, the reefer pallet comprising fabricated pallet components comprising upper and lower plates, side walls and means for providing structural support in the pallet, the components forming at least one return duct extending along an entire dimension of the pallet, and control means formed by the pallet for regulating air or gas flow into the return duct, the control means comprising openings formed in the pallet components for regulating gas or air flow from the cargo containing space into the return duct formed by the reefer pallet, the controlled openings being formed in spaced apart relation along lateral surfaces of the reefer pallet, the pallet further being adapted for abutting arrangement of multiple pallets along the length of the vehicle to form a return duct along the vehicle and in communication with the inlet whereby the control means and return duct of the abutting pallets are capable of regulating refrigerated gas or air flow into the return duct to form a generally uniform pressure differential between the cargo containing space and the return duct in order to achieve more uniform cooling throughout the cargo containing space, wherein an upper surface of the reefer pallet is formed with laterally extending recesses for communication gas or air from the cargo containing space toward the laterally arranged controlled openings.

5. A plurality of reefer pallets each suitable for use in a refrigeration system for a vehicle with an elongated cargo containing space formed by a roof, floor, side walls and front and rear end walls, the refrigeration system being associated with a refrigeration or heating and cooling unit mounted at one end of the cargo containing space, the refrigeration unit having an outlet in communication with the cargo containing space adjacent its roof and an inlet in communication with the cargo containing space adjacent its floor, the reefer pallet comprising fabricated pallet components comprising upper and lower plates, side walls and means for providing structural support in the pallet, the components forming at least one return duct extending along an entire dimension of the pallet, and control means formed by the pallet for regulating air or gas flow into the return duct, the control means comprises openings formed in the pallet components for regulating gas or air flow from the cargo containing space into the return duct formed by the reefer pallet, the pallet further being adapted for abutting arrangement of multiple pallets along the length of the vehicle to form a return duct along the vehicle and in communication with the inlet whereby the control means and return duct of the abutting pallets are capable of regulating refrigerated gas or air flow into the return duct to form a generally uniform pressure differential between the cargo containing space and the return duct in order to achieve more uniform cooling throughout the cargo containing space, whereby the return ducts extending along an entire dimension of each pallet form a duct along the plurality of reefer pallets arranged in abutting relation with the openings establishing uniform gas or air flow into the duct along the plurality of reefer pallets.

6. A reefer pallet suitable for use in a refrigeration system for a vehicle with an elongated cargo containing space formed by a roof, floor, side walls and front and rear end walls, the refrigeration system being associated with a refrigeration or heating and cooling unit mounted at one end of the cargo containing space, the refrigeration unit having an outlet in communication with the cargo containing space adjacent its roof and an inlet in communication with the cargo containing space adjacent its floor, the reefer pallet comprising fabricated pallet components comprising upper and lower plates, side walls and means for providing structural support in the pallet, the components forming at least one return duct extending along an entire dimension of the pallet, and control means formed by the pallet for regulating air or gas flow into the return duct, the control means comprises openings formed in the pallet components for regulating gas or air flow from the cargo containing space into the return duct formed by the reefer pallet, the pallet further being adapted for abutting arrangement of multiple pallets along the length of the vehicle to form a return duct along the vehicle and in communication with the inlet whereby the control means and return duct of the abutting pallets are capable of regulating refrigerated gas or air flow into the return duct to form a generally uniform pressure differential between the cargo containing space and the return duct in order to achieve more uniform cooling throughout the cargo containing space, further comprising laterally extending recesses formed by the pallet for communicating gas or air flow to the openings comprising the control means.

* * * * *